United States Patent [19]

Hill et al.

[11] 4,112,593
[45] Sep. 12, 1978

[54] APPARATUS FOR THE USE IN THE CONSTRUCTION OF ELECTRIC CIRCUITS

[76] Inventors: David Arthur Hill; Abraham Lomnitzer, both of P.O. Box 10523, Johannesburg 2000, South Africa

[21] Appl. No.: 831,310

[22] Filed: Sep. 7, 1977

[51] Int. Cl.² ............................................. G09B 23/18
[52] U.S. Cl. ...................................... 35/19 A; 361/419
[58] Field of Search ......................... 35/19 A; 361/419

[56] References Cited

U.S. PATENT DOCUMENTS

| | | | |
|---|---|---|---|
| 3,175,304 | 3/1965 | Och | 35/19 A |
| 3,327,173 | 6/1967 | Thompson | 35/19 A X |
| 3,410,001 | 11/1968 | Blum | 35/19 A |

FOREIGN PATENT DOCUMENTS

| | | | |
|---|---|---|---|
| 2,118,630 | 10/1971 | Fed. Rep. of Germany | 35/19 A |
| 2,229,441 | 1/1974 | Fed. Rep. of Germany | 35/19 A |
| 2,327,323 | 12/1974 | Fed. Rep. of Germany | 35/19 A |
| 916,838 | 1/1963 | United Kingdom | 35/19 A |

*Primary Examiner*—Harland S. Skogquist
*Attorney, Agent, or Firm*—Ladas, Parry, Von Gehr, Goldsmith & Deschamps

[57] ABSTRACT

The invention relates to circuit boards and educational and experimental equipment made therefrom in which electronic components can be plugged into the board. The board comprises a matrix having a number of apertures in each of which is received a monolithic cluster member having a central socket to receive a prong of an electronic component and four smaller sockets to receive projections on connector links. Spacers on the cluster member engage collars on the prongs to space the component housings off the links.

15 Claims, 4 Drawing Figures

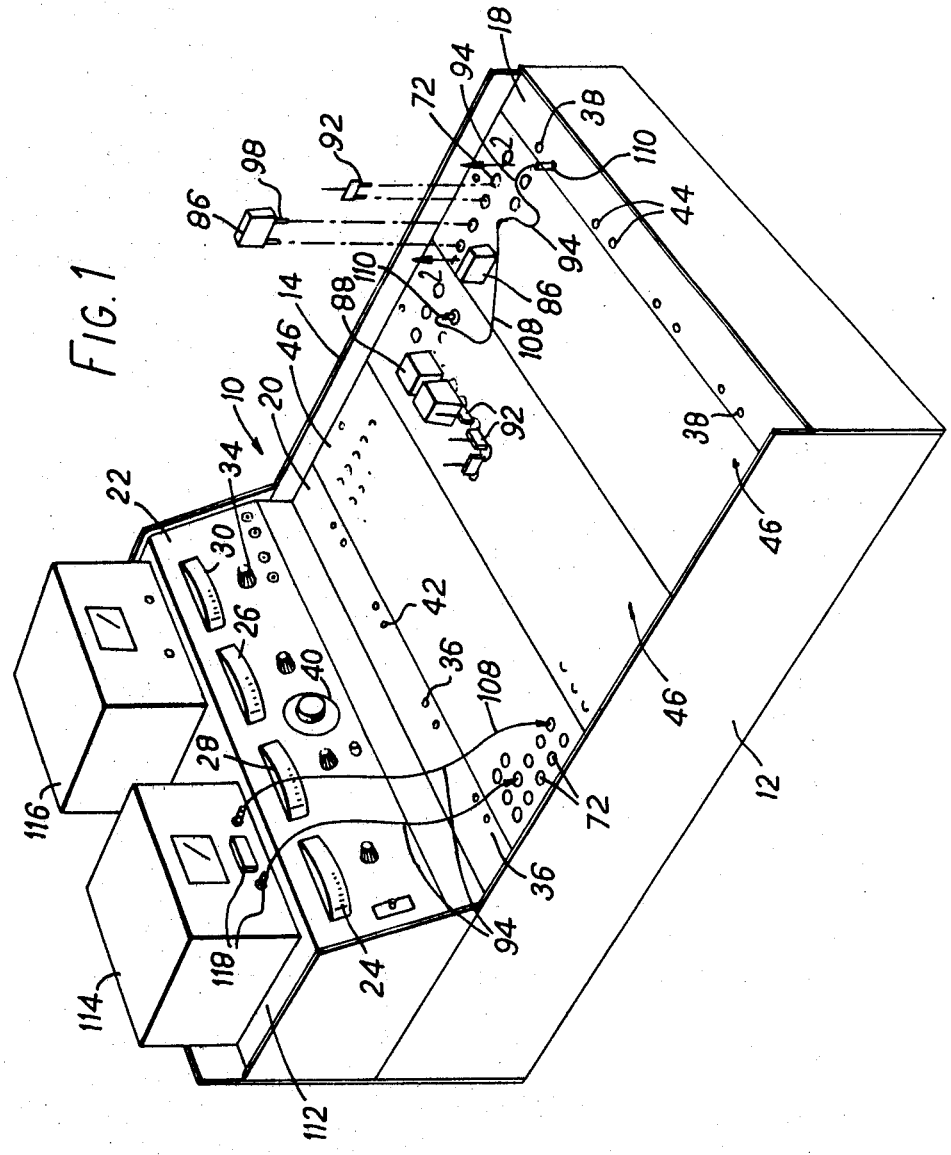

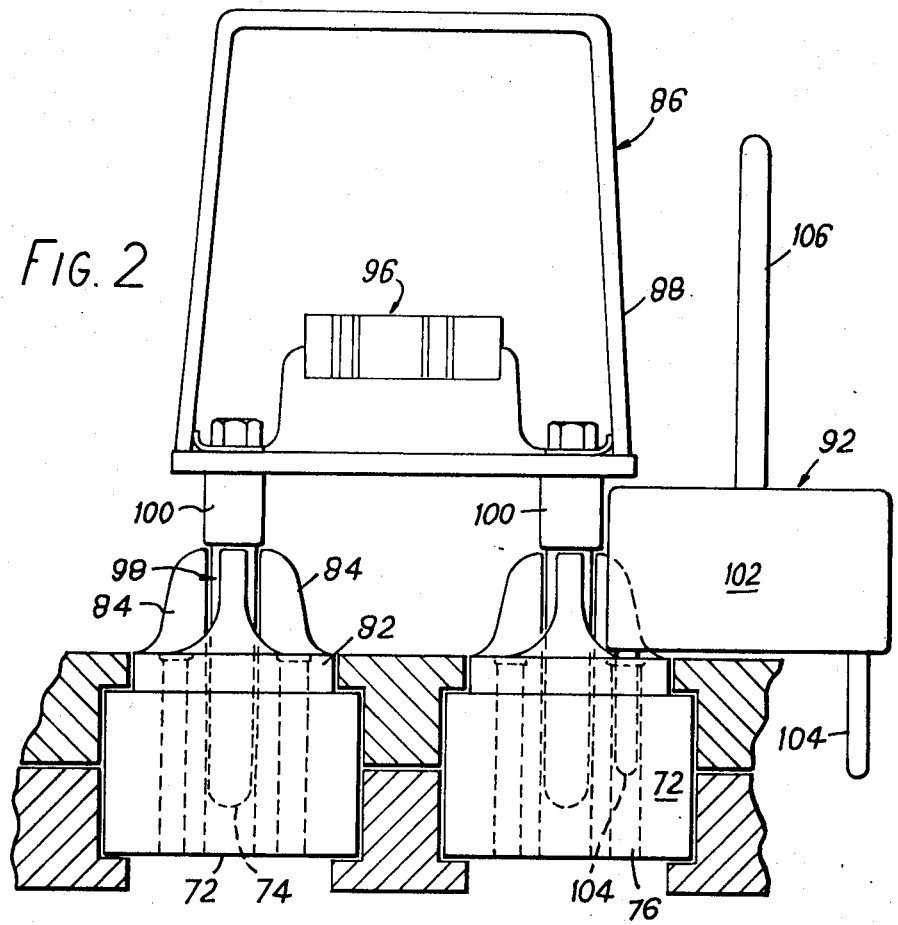
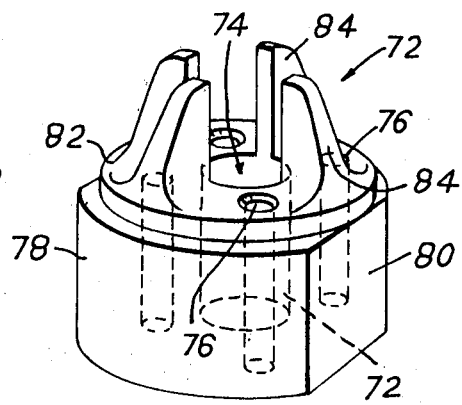

APPARATUS FOR THE USE IN THE CONSTRUCTION OF ELECTRIC CIRCUITS

BACKGROUND OF THE INVENTION

This invention relates to apparatus for use in the construction of electric circuits. It is particularly concerned with such apparatus for use by students and/or experimentors who wish to minimise the purely mechanical steps involved in building of circuits i.e. the steps involved in making and/or breaking the various connections. It is appreciated that these steps are essential when making out circuits for normal commercial use but these prove to be time consuming and wasteful where demonstrations and/or experiments are being carried out using different components.

A number of proposals have been put forward for constructing such apparatus. Typically the apparatus is disclosed in British Patent Specifications Nos. 1,343,868 (in the name of Gaetamo Soncini filed May 5, 1971) and 1,342,128 (in the name of Arthur Fischer dated Aug. 20, 1971).

In specification British Pat. No. 1,343,868 there is disclosed an apparatus for making up electronic circuits comprising an alveolar structure formed by walls defining a plurality of square sections seats in which can be removably housed a hollow plug-in members which incorporate electronic components. These members connect with other members in adjacent seats. The plug-in members can be easily moved from one position to the other to change the circuits being arranged. However the connection arrangements are complex to make and are perforce limited in that members can only be connected to members in adjacent seats. The electrical contacts of the members too comprise tongues which are relatively fragile so that in operation breakages are likely.

The circuit board shown in specification British Pat. No. 1,342,128 is particularly useful for connecting together the connection of electronic chips or integrated circuits. The units comprise a cover plate which overlie a circuit board having a number of recesses. Into these recesses project terminals comprising four spring contacts which are connected to a single base. These provide a very satisfactory connections but are expensive to construct and fairly limited in their application.

Other forms of apparatus are known for use with conventional component modules. Each component module comprises a housing within which are component is contained and on which is printed information relating to the components including its diagrammatic representation. The housing further comprises two or more prongs for insertion into apertures in the circuit board. The size of the prongs and their spacing is quite conventional so that they can be used for a number of circuit boards. Typically the prongs are 4mm in diameter and spaced at 19mm centres. In such circuit boards sockets are provided to receive these prongs. These sockets may be fixed in prearranged circuits in which case each board can be used for one circuit only. Alternatively the sockets may be provided with additional smaller sockets to receive terminals at the ends of links or jumper cables.

Conventionally there are four of these smaller sockets provided adjacent each of the bigger sockets and the smaller sockets and bigger sockets of a cluster (five sockets in all) are riveted or otherwise connected to a metal disc to provide electrical connections therebetween. The sockets are non fitted into apertures in a circuit board. The circuit board thus made tends to be extremely expensive and not quite as robust as might be desired.

SUMMARY OF THE INVENTION

We have found that the main and subsidiary sockets can be formed in a pre-cast member of electrically conducting material. This pre-cast member can be fitted into a matrix which holds a number of such members in position at the pre-determined spacings. Each member includes means which engages corresponding means in the matrix to prevent rotation of the pre-cast member within the matrix. Such means on the member is preferably a flat surface which engages a flat surface of the matrix.

The member preferaby has upstanding spacer arms to engage the underside of the modules or spacers thereon. This would serve to have the modules located above the links for connecting the member together electrically. The members are preferably moveable in the matrix to compensate for slight inaccuracy in the spacings of prongs due to mal-treatment in use or for other reasons. Preferably the matrix comprises a pair of identical members arranged back to back to define openings the upper and lower ends of which are limited by flanges.

The matrix member is preferably an elongated rectangular member with the aperatures arranged in rows parallel to the longer edges of the member and columns parallel to the shorter edges of the members. The spacing of the centres of the apertures in the rows adjacent the edges of the members being one half of the distance between the centres of the apertures in the other rows so that when two such members are placed side by side with their longer edges butting, the prongs of a module can be engaged in the main aperture of a member in an opening of one matrix and the other in an opening in the other matrix.

A SHORT DESCRIPTION OF DRAWINGS

FIG. 1 shows a teaching desk of the invention.
FIG. 2 is a detail on line 2—2 of FIG. 1,
FIG. 3 is a perspective view of a cluster member,
FIG. 4 is a perspective view, partly broken away of a matrix.

DESCRIPTION OF PREFERRED EMBODIMENT

Figure 4:
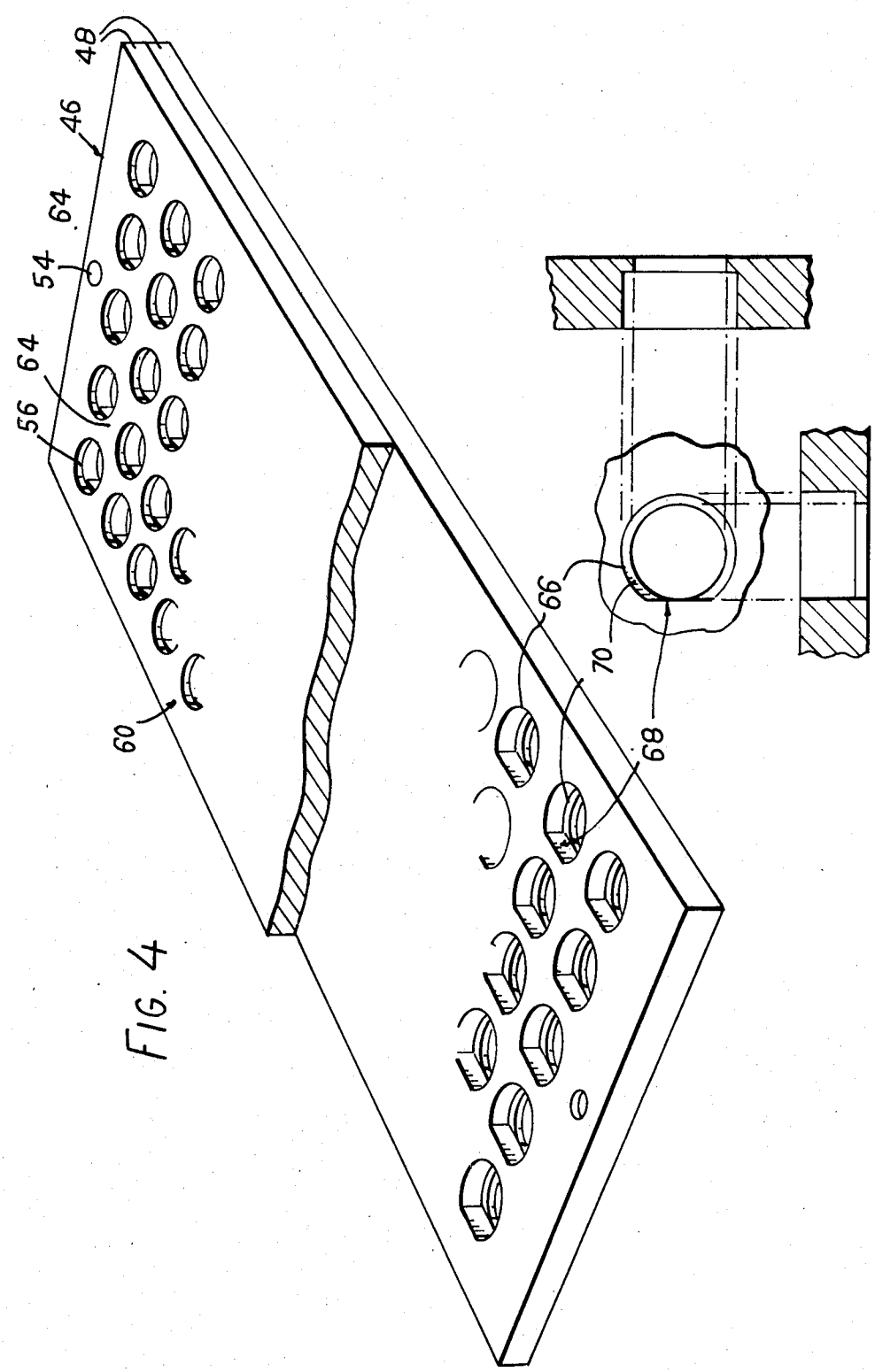

A teaching desk 10 of the invention comprises a container comprising side and end members 12 and 14 and internal side flanges. At the front and rear ends of the container 10 are end flanges 18 and 20 respectively. Behind the flange 20 is a display board 22 supporting two volt meters 24 and 26 and two ammeters 28 and 30 together with adjusting knobs 32 and 34 respectively.

Connected to a pair of meters and adjacent adjusting knob behind the display member 24 are a transformer, and potentiometer of conventional design together with a power socket (not shown) whereby this circuitry can be connected to a source of electrical supply. The electrical circuitry is connected to a set of power take off sockets 36 in the flange 20 and by means of electric cables within the container to sockets 38 in the flange 18.

Also provided behind the display board 22 is a alternating current supply with a device for providing various types of wave forms. A Selector switch 40 is provided for selecting the particular wave form. This supply is connected to sockets 42 and 44 on the flanges 20 and 18 respectively.

In the space between the flanges 20 and 18 are located three matrices 46 arranged with their ends resting on the internal flanges 14. Each matrix 46 comprises two identically injection moulded members 48 which are bolted together by bolts 50 passing through passages and having the bolt heads and nuts received in shaped recesses 54 in conventional manner. Each matrix member is of elongated rectangular form and is provided with a five rows 56 of apertures 58 with the apertures arranged in fifteen columns 60. Numerical markings 62 are provided for the columns and alphabetic markings 64 for the rows so that each aperture can be individually identified.

As mentioned above each matrix 46 comprises two members 48 and each aperture 58 is therefore formed by a pair of recesses one in one member 48 and the other in the other member. Each recess comprises a substantially cylindrical wall 66 that is provided with a chordal flat surface 68 so that this recess is not circular. Concentric with the arcuate wall 66 of the recess is a shoulder 70 which forms part of the outer surface of the member 48 so that the latter appears to contain a number of circular section openings.

Fitted into each aperture is a socket cluster 72. Each cluster 72 is formed as a die-casting and is provided with an enlarged central socket 74 and four smaller sockets 76 of one half the diameter of the main socket 74. The sockets 74 and 76 are broached for consistency and accuracy of size. Each cluster 72 has a main body portion which is just slightly less in axial dimension than the distance between the shoulder 70 of the two members forming the matrix 46. This body portion of generally the same cross-section as the apertures with a part cylindrical wall 78 having a flat surface 80 to correspond to the flat surface 68 of the apertures. A co-axial low land 82 projects from the body. The dimensions of the land and body are such that the cluster can fit into an aperture in the matrix and is capable of small movements relatively thereto for the purpose which will be described.

Four axially extending spacers 84 are provided adjacent the main socket 74 and spaced at 90° to each other, being located between the intermediate sockets 76. The spaces between the spacers 84 form recesses for the purpose which will be described.

A number of electronic component members 86 88 and 90 links 92 and jumpers 94 are provided. The component members 86 each comprise an enlarged plastics housing 88 within which a component 96 is received. This component 96 is connected to prongs 98 which project out of the housing 88 and are provided with large collars 100 immediately underneath the housing 88. The housing 88 may also contain paper or other cards on which are printed the electronic diagram for the component as well as the size of the components.

These component members 86 have had two, three or four prongs as need be. The links 92 comprise a low body 102 with small prongs 104 projecting therefrom which prongs 104 are adapted to be received in the small sockets 76 and to connect adjacent sockets together so that two clusters 72 which are linked by the link 92 are electrically connected. The body 102 has a large plastic handle 106 projecting therefrom for ease of manipulation. The jumpers each comprise a wire 108 having terminal units 110 at each end which terminal units can be received in the sockets 76 or the sockets in the display flanges 18 and 20.

The combined height of the spacers 84 and the spacing collars 100 is such that the body 102 of the links 92 or the terminals 110 when received in the socket 74 will be spaced from the underside of the housing 88 of the component member.

We return now to the description of the box 10. In addition to the display board 22 there is located therebehind a shelf 112. On to this shelf can be and usually is placed a pair of measuring devices 114 and 116. The device 114 is a multi-meter having four sockets 118 and a display. By connecting resistor components across two of these sockets 118 multi-meter can be changed from a volt meter to an ammeter as desired. The other measuring device 116 is a wave form generator.

By using jumper leads 94 from various parts of the matrix appropriate readings can be made so that the student can observe how his circuit is operating.

Located above one of the matrixes 46 is a removable plastic sheet on to which a circuit is printed. By following the instructions on that sheet a student can lay out the appropriate circuit for testing. Such sheets may be provided above all of the matrix members. However they may be omitted entirely for the more advanced student and for the experimental. If desired one of the matrixes 46 may be removed and substituted with a circuit board comprising two "QUICKTEST SOCKETS" (illustrated in U.S. Patent No. D 235,554 to Ronald J. Portugal dated June 24, 1975 and as described in British Pat. No. 1,342,128 supra) and two "QUICKTEST BUSSTRIPS" sold by Continential Specialties Company. This would be done for more advanced students using integrated circuits or chips or in the experimentation.

It is a very flexible unit allowing a wide range of circuits to be devised. The matrix units are also inexpensive to produce as compared to other units presently on the market. Because of the play between the clusters and the apertures the clusters can move slightly to compensate for any inaccuracies in the locations of the prongs of the component units due to poor manufacturing tolerances and/or abuse in practice. Excellent connections can be made between the prongs and the clusters. The clusters can be made of any suitable material. Typically and in the above described embodiments the clusters comprise zinc which may be silver plated for improved connection between prongs and sockets.

The invention is not limited to the precise constructional details above described but the spirit and scope of the invention is to be obtained from the appended claims. Thus typically the clusters may be machined or forged and may be of other non-circular cross-section. Also the matrix may comprise a single matrix member 48 and a flat board attached thereto to close off the apertures. Rivets or other securing means may be used instead of the bolts 50.

We claim:
1. A circuit board comprising:
   (a) a matrix member,
   (b) a plurality of apertures in the matrix member,
   (c) a plurality of cluster members one in each aperture and each having a main prong receiving socket therein and at least one subsidiary socket, and
   (d) engaging means on the board and the cluster members to prevent rotation of the cluster relative to the board.

2. A circuit board as claimed in claim 1 in which each cluster member has at least two subsidiary sockets therein.

3. A circuit board as claimed in claim 2 comprising four subsidiary sockets in each cluster member which subsidiary sockets are located at 90° subsidiary each other.

4. A circuit board as claimed in claim 1 further comprising spacer means upwardly projecting from each cluster member.

5. A circuit board as claimed in claim 4 further comprising four subsidiary sockets and four spacer members located respectively therebetween and projecting upwardly from the upper surface of each cluster member.

6. A circuit board as claimed in claim 1 in which the apertures and the cluster members have each a part cylindrical wall with a connecting flat wall, the two flat walls interengaging to prevent the cluster from rotating in the aperture.

7. A circuit board as claimed in claim 1 in which the matrix member is provided with flanges at each end of the aperture and in which the clusters members engage the flanges and are held thereby against axial movement.

8. A circuit board as claimed in claim 1 in which the matrix member comprises two parts each provided with a surface to engage the clusters to prevent axial movement thereof.

9. A circuit board as claimed in claim 8 in which the parts of the matrix member are identical.

10. A circuit board comprising
 (a) a matrix including two matrix members secured together, each matrix member having formed therein a series of equispaced rows and columns, each aperture having a part-cylindrical wall joined by a chordal straight wall and a shoulder at at least one end defining a cylindrical end opening which is concentric with and has a radius smaller than that of the part-cylindrical wall, and
 (b) a cluster member in each aperture, each cluster member comprising
  (i) a body which is part cylindrical in section with a flat chordal wall thereon which is larger than the end opening and which fits within the aperture,
  (ii) a raised portion which fits within the end opening,
  (iii) a main axially extending central socket,
  (iv) four smaller sockets located at 90° one to another about the main socket and
  (v) upstanding spacer members upstanding from the said raised portion.

11. An electrical circuit comprising a circuit board as claimed in claim 9 together with an electronic component member having two prongs received respectively in the main sockets of two cluster members and at least one rigid link member having a pair of projections received respectively in smaller sockets of adjacent cluster members.

12. An electric circuit of claim 11 in which the spacer members engage the electronic component member so that the body of the component member are spaced above the links members.

13. An electric circuit of claim 12 in which the component member has a spacing collar on each prong and engaging the spacer member of the cluster member in central socket of which the prong engages.

14. A cluster member comprising a monolithic metal member having
 (a) a body of non-circular cross-section,
 (b) a main axially extending prong receiving socket,
 (c) four subsidiary equispaced sockets located about the main socket and
 (d) spacer members upstanding from the body.

15. A cluster member as claimed in claim 14 formed by die-casting.

* * * * *